United States Patent
Ronchetto et al.

(10) Patent No.: US 11,913,549 B2
(45) Date of Patent: Feb. 27, 2024

(54) TENSIONER FOR AN ACCESSORY TRANSMISSION OF AN INTERNAL COMBUSTION ENGINE

(71) Applicant: DAYCO EUROPE S.R.L., Chieti (IT)

(72) Inventors: Roberto Ronchetto, Chieti (IT); Gianluca Osella, Chieti (IT)

(73) Assignee: DAYCO EUROPE S.R.L., Chieti (IT)

( * ) Notice: Subject to any disclaimer, the term of this patent is extended or adjusted under 35 U.S.C. 154(b) by 227 days.

(21) Appl. No.: 17/625,505

(22) PCT Filed: Jul. 8, 2020

(86) PCT No.: PCT/IB2020/056421
§ 371 (c)(1),
(2) Date: Jan. 7, 2022

(87) PCT Pub. No.: WO2021/005527
PCT Pub. Date: Jan. 14, 2021

(65) Prior Publication Data
US 2022/0268342 A1 Aug. 25, 2022

(30) Foreign Application Priority Data

Jul. 8, 2019 (IT) .................. 102019000011160

(51) Int. Cl.
*F16H 7/08* (2006.01)
*F16H 7/12* (2006.01)

(52) U.S. Cl.
CPC ..... *F16H 7/1218* (2013.01); *F16H 2007/081* (2013.01); *F16H 2007/0893* (2013.01)

(58) Field of Classification Search
CPC ............. F16H 7/1218; F16H 2007/081; F16H 2007/0893

(Continued)

(56) References Cited

U.S. PATENT DOCUMENTS

| 4,661,087 A * | 4/1987 | Henderson ............ F16H 7/1218 474/135 |
| 2004/0014542 A1* | 1/2004 | Quintus ................ F16H 7/1218 474/135 |
| 2005/0146127 A1* | 7/2005 | Schonmeier .......... F16H 7/1218 280/806 |

FOREIGN PATENT DOCUMENTS

JP H0530595 U * 4/1993
WO 2013/142951 A1 10/2013

(Continued)

OTHER PUBLICATIONS

PCT/IB2020/056421, International Search Report and Written Opinion, dated Nov. 6, 2020 (12 pages).

(Continued)

*Primary Examiner* — Gene O Crawford
*Assistant Examiner* — Emily R Kincaid
(74) *Attorney, Agent, or Firm* — FisherBroyles, LLP; Susan M. Oiler

(57) ABSTRACT

A tensioner for a belt transmission of a motor vehicle engine has a fixed part configured to be constrained to the engine and provided with a pin defining a rotation axis (A), an arm having a hub portion hinged on the pin and rotatable about the axis (A) and an opposite portion rotatably supporting a pulley configured to cooperate with a transmission belt, a main spring interposed between the fixed part and the arm to exert a thrust on the arm such as to rotate the arm towards the belt, a roller bearing supporting the arm on the pin, and a pair of damping devices exerting on the arm opposite actions so as to minimize the load on the bearing.

10 Claims, 2 Drawing Sheets

(58) Field of Classification Search
USPC .......................................................... 474/135
See application file for complete search history.

(56) References Cited

FOREIGN PATENT DOCUMENTS

| WO | 2015/092718 A1 | 6/2015 | | |
|----|----|----|----|----|
| WO | WO-2015092718 A1 | * | 6/2015 | ........... F16H 7/0829 |

OTHER PUBLICATIONS

Office Action from corresponding European Application No. 20750729.4-1012, dated May 2, 2022 (5 pages).

* cited by examiner

TENSIONER FOR AN ACCESSORY TRANSMISSION OF AN INTERNAL COMBUSTION ENGINE

CROSS-REFERENCE TO RELATED APPLICATIONS

This patent application claims priority from Italian patent application no. 102019000011160 filed on Aug. 7, 2019, the entire disclosure of which is incorporated herein by reference.

TECHNICAL FIELD

The present invention concerns a tensioner for a belt transmission, and particularly, but not exclusively, for an accessory transmission of an industrial vehicle.

As is known, tensioners for accessory transmissions comprise a fixed part configured to be fixed to the engine and defining a rotation pin, an arm supported rotatably on the rotation pin and carrying, at an end thereof, a pulley designed to cooperate with the transmission belt, and a spring acting on the arm so as to tension the belt.

BACKGROUND ART

The known tensioners of the above-mentioned type must meet some fundamental requirements aimed at optimizing the life of the tensioner and the belt. In particular, the arm must be maintained in conditions of perfect alignment, namely it must rotate on a plane orthogonal with respect to the axis of the pin and not be subject to oscillations outside the plane which could lead to noisiness, premature wear and, possibly, detachment of the belt.

The alignment function is normally carried out by one or more bushes made of plastic or composite material having the function of a plain bearing for radial and axial support of the arm on the pin.

Said bushes are subject to wear; therefore the tensioner has a limited life, shorter than that of the vehicle.

WO2015/092718 A1 describes tensioners in which, in order to prolong their working life, the bushes are replaced by rolling bearings. In the tensioners described therein, the arm oscillations are damped by means of a C spring which exerts a tilting moment on the arm which must be balanced by the bearings.

The object of the present invention is to provide a tensioner of the above-mentioned type, which is provided with an improved damping system that optimizes the load conditions of the bearings.

DISCLOSURE OF INVENTION

The above-mentioned object is achieved by a tensioner according to claim 1.

BRIEF DESCRIPTION OF THE DRAWINGS

For a better understanding of the present invention, a preferred embodiment is described below by way of non-limiting example and with reference to the attached drawings, in which.

BEST MODE FOR CARRYING OUT THE INVENTION

Figure 1:
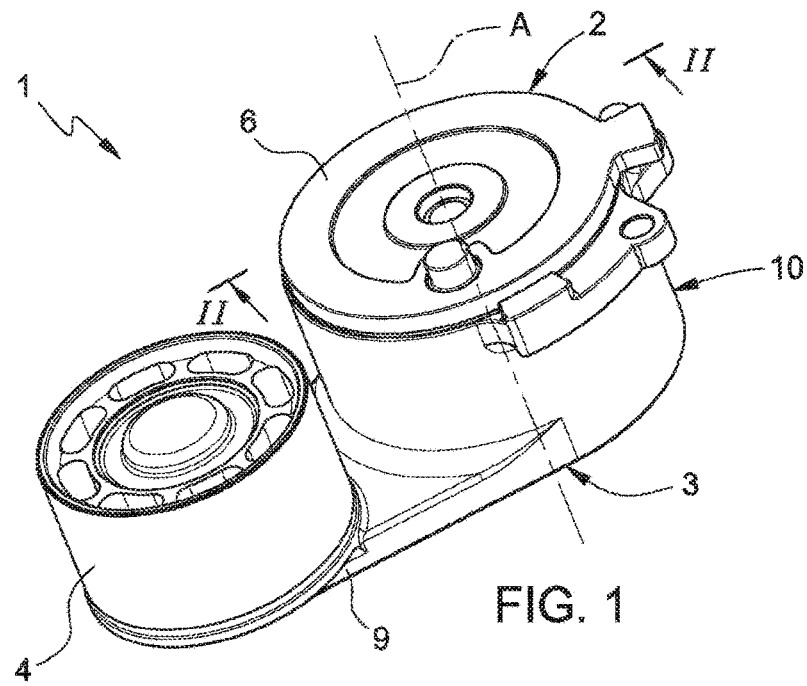
FIG. 1 is a perspective view of a tensioner according to the present invention.
Figure 2:
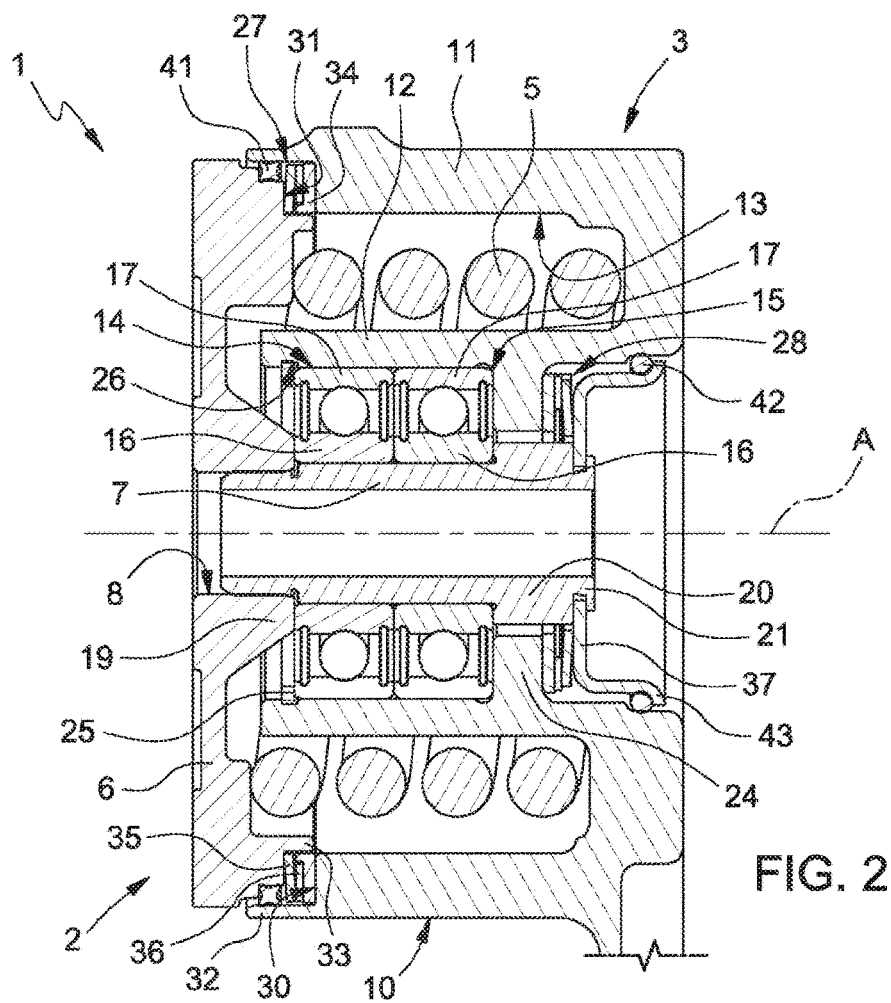
FIG. 2 is a section of the tensioner along the line II-II of FIG. 1.
Figure 3:
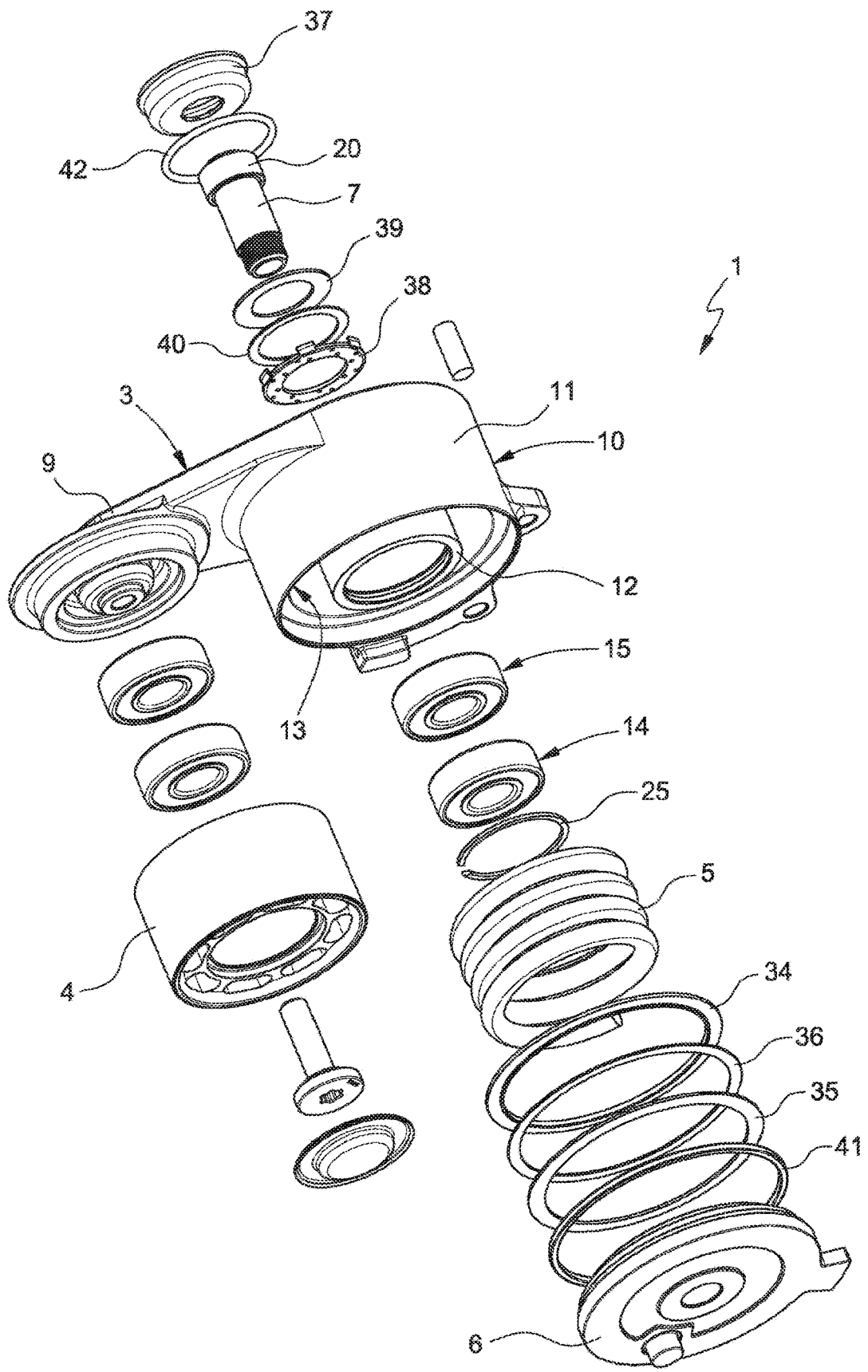
FIG. 3 is an exploded perspective view of the tensioner of FIG. 1.

With reference to the figures, the number 1 indicates overall a tensioner for an accessory transmission of an industrial vehicle.

The tensioner essentially comprises:
a fixed part 2 designed to be fixed to the vehicle engine;
an arm 3 rotatable with respect to the fixed part 2 about an axis A;
a pulley 4 carried rotatably by the arm 3 at an end thereof 9 and designed to cooperate with a belt (not illustrated); and
a helical spring 5 secured at the respective ends (in a known way and not illustrated) to the fixed part 2 and to the arm 3 to exert on the latter an elastic load such as to push the pulley 4 into contact with the belt and maintain a predetermined tension on the same.

More in particular, the fixed part 2 comprises a base plate 6 designed to rest on a surface of the engine, and a substantially hollow cylindrical pin 7 having axis A, driven into a central hole 8 of the base plate 6 and extending cantilevered from the latter.

The fixed part 2 is designed to be fixed on the engine by a screw (not illustrated) mounted through the pin 7.

The arm 3 comprises a hub portion 10, opposite the end 9 bearing the pulley 4, having a substantially hollow cylindrical shape and comprising an outer wall 11 and an inner wall 12 forming between them a cavity 13 open towards the base plate 6.

The arm 3 is supported on the fixed part 2 by means of a pair of rolling bearings 14 and 15, preferably ball bearings, radially interposed between the inner wall 12 of the hub portion 10 of the arm 3 and the pin 7. Expediently, each of the bearings 14, 15 has an inner ring 16 driven onto the pin 7 and an outer ring 17 driven into the inner wall 12; the two inner rings 16 and the two outer rings 17 are in axial abutment with one another.

The inner ring 16 of the bearing 14 is in axial abutment with an annular shoulder 19 of the base plate 6 surrounding the pin 7, the inner ring 16 of the bearing 15 is in axial abutment with an annular shoulder 20 of the pin 7, in the vicinity of a free end 21 thereof; the outer ring 17 of the bearing 15 is in axial abutment with an inner annular shoulder 24 of the inner wall 12, the outer ring 17 of the bearing 14 is axially retained against the outer ring 17 of the bearing 15 by an elastic ring 25 housed in an inner seat 26 at an end of the inner wall 12.

According to the present invention, the tensioner 1 comprises a first damping device 27 and a second damping device 28 with axial action interposed between the fixed part 2 and the arm 3 for damping the oscillations of the latter.

According to the example illustrated, the first damping device 27 is housed in a compartment axially delimited by the head surface 30 of the outer wall 11 of the hub portion 10 of the arm 3 (below, for the sake of brevity, "the surface 30 of the arm 3") and a perimeter edge 31 of the base plate 6, and radially delimited towards the outside by an end cylindrical axial projection 32 of the outer wall 11 and internally by an annular axial projection 33 of the base plate 6. The first damping device 27 essentially comprises a first damping ring 34 arranged in axial abutment against the surface 30 of the arm 3, with the possibility of relative sliding, and a first disc spring 35 resting axially against the perimeter edge 31 of the base plate 6 and generating a predetermined axial load on the first damping ring 34 designed to keep it against the surface 30 of the arm 3. Expediently, to avoid premature wear of the first damping ring 34, between the latter and the first disc spring 35 a first metal washer 36 is interposed.

The second damping device 28 is axially comprised between the shoulder 24 of the inner wall 12 and an end cover 37 fixed on the free end 21 of the pin 7, in abutment against the shoulder 20, by means of clinching said pin.

The second damping device 28 essentially comprises a second damping ring 38 resting axially against the shoulder 24, and a second disc spring 39 resting axially against the cover 37 and generating an axial load on the second damping ring 38. Expediently, to avoid premature wear of the second damping ring 38, between the latter and the second disc spring 39 a metal washer 40 is interposed.

In order to obtain damping which is as regular as possible, the friction between the damping rings 34, 38 and the corresponding surfaces of the arm 3 should be as low as possible. A material that can be used for the damping rings 34, 38 is a PA46+PTFE-based thermoplastic material, for example Stanyl® TW371 by DSM Engineering Plastics B.V.; preferably, grease is applied between the above-mentioned rings and the respective surfaces of the arm in relative sliding contact, in order to reduce the friction coefficient. The optimal values of the friction coefficient are between 0.1 and 0.2.

The helical spring 5, in use, is subject to a combined torsion and compression load, and therefore exerts an axial thrust tending to axially separate the arm 3 from the base plate 6. The elastic load exerted in use by the first and the second disc spring 35, 39 is expediently different, so as to balance the axial thrust exerted by the helical spring 5. In particular, the axial load exerted by the first disc spring 35, corresponding to that of the helical spring 5, is lower than the axial load exerted by the second disc spring 39, so that there is no axial load on the bearings 14 during installation of the tensioner 1, corresponding to a medium load of the helical spring 5.

Lastly, the tensioner 1 comprises a first and a second ring seal element 41, 42 designed to protect the respective damping devices 27, 28 from any infiltrations of dirt from the outside. The first seal element 41 is interposed between the base plate 6 and the cylindrical axial projection 32 of the outer wall 11; the second seal element 42 is interposed between the inner wall 12 and a perimeter flange 43 of the end cover 37.

Operation of the tensioner 1 is as follows.

The arm 3 is supported in an angularly free manner on the pin 7 by the bearings 14, 15, and is subject to the elastic load of the helical spring 5 and the tension of the belt, not illustrated.

Due to the tension variations of the belt, the arm oscillates around the pin 7. The bearings 14, 15 ensure that the rotation of the arm 3 is parallel to a plane perpendicular to the axis A of the pin 7.

The oscillations of the arm 3 resulting from the belt tension variations are damped by the relative sliding of the damping rings 34, 38 with the corresponding surfaces of the arm 3, under the axial load of the disc springs 35, 39.

The purely axial action of the disc springs 35, 39 allows not only better damping control, but also eliminates any tilting moment on the bearings 14, 15.

Furthermore, since the axial loads of the helical spring 5 and of the disc springs 35, 39 are in equilibrium with each other, the bearings 14,15 are subject exclusively to the resulting hub load transmitted by the belt.

The optimization of the load conditions of the bearings prolongs their life. The tensioner is therefore suitable for applications "for life", in which no replacement is scheduled during the working life of the vehicle.

The invention claimed is:

1. A tensioner for a belt transmission of a motor vehicle engine, comprising:
    a fixed part comprising a base configured to be fixedly secured with respect to the engine and a pin defining a rotation axis (A);
    an arm having a hub portion hinged on the pin and rotatable about the axis (A) and an opposite portion rotatably supporting a pulley configured to cooperate with a transmission belt;
    a main spring interposed between the fixed part and the arm to exert on the arm a thrust such as to rotate said arm towards the belt;
    at least one rolling bearing interposed between the arm and the pin; and damping means for damping the oscillations of the arm about the pin,
    wherein said damping means comprise a first damping device and a second damping device exerting opposite actions on the arm.

2. The tensioner as claimed in claim 1, wherein said first and second damping device have an axial action.

3. The tensioner as claimed in claim 1, wherein said first and second damping device comprise respective spring elements exerting axial loads in opposite directions to one other.

4. The tensioner as claimed in claim 3, wherein the axial actions of said spring elements and the axial action of the main spring are substantially in equilibrium with each other so as to minimize the axial load on said at least one rolling bearing.

5. The tensioner as claimed in claim 1, wherein the damping devices comprise respective damping rings cooperating in a sliding manner with respective surfaces of the arm under the action of the respective spring elements.

6. The tensioner as claimed in claim 1, wherein said spring element are disc springs.

7. The tensioner as claimed in claim 1, wherein said hub portion comprises an outer cylindrical wall and an inner cylindrical wall delimiting between them an annular cavity which houses said main spring, said bearings being arranged radially between said pin and said inner cylindrical wall.

8. The tensioner as claimed in claim 7, wherein the first damping device is arranged between the base and a head surface of the outer wall, and the second damping device is arranged between an end cap integral with the pin and an inner shoulder of the inner wall.

9. The tensioner according to claim 8, wherein said at least one bearing is in axial abutment with said shoulder.

10. The tensioner according to claim 7 to 9, comprising annular sealing elements configured to protect the respective damping devices from dirt.

* * * * *